(12) United States Patent
Li et al.

(10) Patent No.: US 8,742,820 B1
(45) Date of Patent: Jun. 3, 2014

(54) POWER CIRCUIT AND WIRELESS NETWORK ADAPTER

(71) Applicant: Huawei Device Co., Ltd., Shenzhen (CN)

(72) Inventors: Yanbin Li, Xi'an (CN); Dingjun Qian, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/144,302

(22) Filed: Dec. 30, 2013

Related U.S. Application Data

(63) Continuation of application No. PCT/CN2012/087402, filed on Dec. 25, 2012.

(51) Int. Cl.
  *H03K 5/08* (2006.01)
(52) U.S. Cl.
  USPC .......................................................... 327/318
(58) Field of Classification Search
  None
  See application file for complete search history.

(56) References Cited

U.S. PATENT DOCUMENTS

2012/0182076 A1* 7/2012 Kim et al. ................. 331/15
2014/0038672 A1* 2/2014 Yang et al. ................ 455/558

* cited by examiner

*Primary Examiner* — Lincoln Donovan
*Assistant Examiner* — Khareem E Almo
(74) *Attorney, Agent, or Firm* — Slater & Matsil, L.L.P.

(57) ABSTRACT

The present invention provides a power circuit, including a current-limiting chip, a current-limiting value setting circuit, and a baseband chip. A current setting port of the current-limiting chip is connected to a general-purpose input/output port of the baseband chip through the current-limiting value setting circuit. The general-purpose input/output port is configured to generate a first signal in a first time sequence period of timeslot transmitting of the baseband chip so that the current-limiting value setting circuit sets a current-limiting value of the current-limiting chip as a first current-limiting value. In the other time sequence periods of timeslot transmitting of the baseband chip, the general-purpose input/output port generates a second signal so that the current-limiting value setting circuit sets the current-limiting value of the current-limiting chip as a second current-limiting value. The first current-limiting value is greater than the second current-limiting value.

17 Claims, 6 Drawing Sheets

A  Single-timeslot transmitting

B  Dual-timeslot transmitting

C  Three-timeslot transmitting

POWER CIRCUIT AND WIRELESS NETWORK ADAPTER

This application is a continuation of International Application No. PCT/CN2012/087402, filed on Dec. 25, 2012, which is incorporated herein by reference in its entirety.

TECHNICAL FIELD

The present invention relates to the field of electronic technologies, and in particular to a power circuit and a wireless network adapter.

BACKGROUND

With development of electronic technologies, how to downsize a terminal product and reduce its device costs is a current headache. For a wireless network adapter, implementing a miniature power circuit and reducing its costs are a breakthrough.

In the prior art, generally a wireless network adapter includes large capacitors. The costs of these large capacitors are relatively high, and volumes of these large capacitors are relatively large. This is not good for reducing the costs of the wireless network adapter and not good for implementing a miniature wireless network adapter. Currently, in some solutions, a current-limiting chip in the wireless network adapter is removed to save capacitors. However, when such a wireless network adapter is used on a notebook computer, the notebook computer will restart as a result, thereby affecting normal use of the notebook computer and the wireless network adapter.

Therefore, none of the existing solutions can reduce the capacitors of the wireless network adapter without compromising normal working of the wireless network adapter.

SUMMARY OF THE INVENTION

According to a first aspect of the present invention, a power circuit is provided, including a current-limiting chip, a current-limiting value setting circuit, and a baseband chip. A current setting port of the current-limiting chip is connected to a general-purpose input/output port of the baseband chip through the current-limiting value setting circuit. The general-purpose input/output port is configured to generate a first signal in a first time sequence period of timeslot transmitting of the baseband chip so that the current-limiting value setting circuit sets a current-limiting value of the current-limiting chip as a first current-limiting value. In the other time sequence periods of timeslot transmitting of the baseband chip, the general-purpose input/output port generates a second signal so that the current-limiting value setting circuit sets the current-limiting value of the current-limiting chip as a second current-limiting value. The first current-limiting value is greater than the second current-limiting value.

In a first possible implementation manner of the first aspect, the current-limiting value setting circuit includes a first impedor and a second impedor. The current setting port of the current-limiting chip is connected to the general-purpose input/output port of the baseband chip through the first impedor, and the general-purpose input/output port of the baseband chip is connected to the ground through the second impedor. In the first time sequence period of timeslot transmitting of the baseband chip, the general-purpose input/output port generates a low level. In the other time sequence periods of timeslot transmitting and a non-timeslot-transmitting period of the baseband chip, the general-purpose input/output port generates a high-impedance state.

In a second possible implementation manner of the first aspect, the current-limiting value setting circuit includes a third impedor and a fourth impedor. The current setting port of the current-limiting chip is connected to the general-purpose input/output port of the baseband chip through the third impedor, and the general-purpose input/output port of the baseband chip is connected to the ground through the fourth impedor. In the first time sequence period of timeslot transmitting of the baseband chip, the general-purpose input/output port generates a low level. In the other time sequence periods of timeslot transmitting and a non-timeslot-transmitting period of the baseband chip, the general-purpose input/output port generates a high-impedance state.

In a third possible implementation manner of the first aspect, the current-limiting value setting circuit includes a fifth impedor, a sixth impedor, and a MOS transistor. The current setting port of the current-limiting chip is connected to the ground through the fifth impedor. A drain electrode of the MOS transistor is connected to the current setting port of the current-limiting chip, a gate electrode of the MOS transistor is connected to the general-purpose input/output port of the baseband chip, and a source electrode of the MOS transistor is connected to the ground through the sixth impedor. The MOS transistor is an N-channel MOS transistor. In the first time sequence period of timeslot transmitting of the baseband chip, the general-purpose input/output port generates a high level and the drain electrode of the MOS transistor is conducted with the source electrode. In the other time sequence periods of timeslot transmitting and a non-timeslot-transmitting period of the baseband chip, the general-purpose input/output port generates a low level and the drain electrode of the MOS transistor is disconnected with the source electrode. Alternatively, in other embodiment, the MOS transistor is a P-channel MOS transistor. In the first time sequence period of timeslot transmitting of the baseband chip, the general-purpose input/output port generates a low level and the drain electrode of the MOS transistor is conducted with the source electrode. In the other time sequence periods of timeslot transmitting and a non-timeslot-transmitting period of the baseband chip, the general-purpose input/output port generates a high level and the drain electrode of the MOS transistor is disconnected with the source electrode.

In a fourth possible implementation manner of the first aspect, the current-limiting value setting circuit includes a seventh impedor, an eight impedor, and an analog switch. The current setting port of the current-limiting chip is connected to the ground through the seventh impedor. A first channel of the analog switch is connected to the current setting port of the current-limiting chip, a second channel of the analog switch is connected to the ground through the eighth impedor, and a control port of the analog switch is connected to the general-purpose input/output port of the baseband chip. In the first time sequence period of timeslot transmitting of the baseband chip, the general-purpose input/output port generates a high level, and the first channel of the analog switch is conducted with the second channel. In the other time sequence periods of timeslot transmitting and a non-timeslot-transmitting period of the baseband chip, the general-purpose input/output port generates a low level, and the first channel of the analog switch is disconnected with the second channel.

In a fifth possible implementation manner, in combination with the first aspect or any one of the first possible implementation manner to the fourth possible implementation manner of the first aspect, the power circuit further includes a capacitor. One end of the capacitor is connected to a current output port of the current-limiting chip, and the other end of the capacitor is connected to the ground.

In a sixth possible implementation manner, in combination with the first aspect or any one of the first possible implementation manner to the fifth possible implementation manner of the first aspect, the power circuit further includes a power management unit. A current input port of the power management unit is connected to the current output port of the current-limiting chip, and a current output port of the power management unit is connected to a current input port of the baseband chip.

According to a second aspect of the present invention, a wireless network adapter is provided including a power circuit, which includes a current-limiting chip, a current-limiting value setting circuit, and a baseband chip. A current setting port of the current-limiting chip is connected to a general-purpose input/output port of the baseband chip through the current-limiting value setting circuit. The general-purpose input/output port is configured to generate a first signal in a first time sequence period of timeslot transmitting of the baseband chip so that the current-limiting value setting circuit sets a current-limiting value of the current-limiting chip as a first current-limiting value. In the other time sequence periods of timeslot transmitting of the baseband chip, the general-purpose input/output port generates a second signal so that the current-limiting value setting circuit sets the current-limiting value of the current-limiting chip as a second current-limiting value. The first current-limiting value is greater than the second current-limiting value.

In a first possible implementation manner of the second aspect, the current-limiting value setting circuit includes a first impedor and a second impedor, where the current setting port of the current-limiting chip is connected to the general-purpose input/output port of the baseband chip through the first impedor, and the general-purpose input/output port of the baseband chip is connected to the ground through the second impedor; in the first time sequence period of timeslot transmitting of the baseband chip, the general-purpose input/output port generates a low level; and in the other time sequence periods of timeslot transmitting and a non-timeslot-transmitting period of the baseband chip, the general-purpose input/output port generates a high-impedance state.

In a second possible implementation manner of the second aspect, the current-limiting value setting circuit includes a third impedor and a fourth impedor, where the current setting port of the current-limiting chip is connected to the general-purpose input/output port of the baseband chip through the third impedor, and the general-purpose input/output port of the baseband chip is connected to the ground through the fourth impedor; in the first time sequence period of timeslot transmitting of the baseband chip, the general-purpose input/output port generates a low level; and in the other time sequence periods of timeslot transmitting and a non-timeslot-transmitting period of the baseband chip, the general-purpose input/output port generates a high-impedance state.

In a third possible implementation manner of the second aspect, the current-limiting value setting circuit includes a fifth impedor, a sixth impedor, and a MOS transistor, where the current setting port of the current-limiting chip is connected to the ground through the fifth impedor; a drain electrode of the MOS transistor is connected to the current setting port of the current-limiting chip, a gate electrode of the MOS transistor is connected to the general-purpose input/output port of the baseband chip, and a source electrode of the MOS transistor is connected to the ground through the sixth impedor; and if the MOS transistor is an N-channel MOS transistor, in the first time sequence period of timeslot transmitting of the baseband chip, the general-purpose input/output port generates a high level and the drain electrode of the MOS transistor is conducted with the source electrode, and in the other time sequence periods of timeslot transmitting and a non-timeslot-transmitting period of the baseband chip, the general-purpose input/output port generates a low level and the drain electrode of the MOS transistor is disconnected with the source electrode; or if the MOS transistor is a P-channel MOS transistor, in the first time sequence period of timeslot transmitting of the baseband chip, the general-purpose input/output port generates a low level and the drain electrode of the MOS transistor is conducted with the source electrode, and in the other time sequence periods of timeslot transmitting and a non-timeslot-transmitting period of the baseband chip, the general-purpose input/output port generates a high level and the drain electrode of the MOS transistor is disconnected with the source electrode.

In a fourth possible implementation manner of the second aspect, the current-limiting value setting circuit includes a seventh impedor, an eight impedor, and an analog switch, where the current setting port of the current-limiting chip is connected to the ground through the seventh impedor; a first channel of the analog switch is connected to the current setting port of the current-limiting chip, a second channel of the analog switch is connected to the ground through the eighth impedor, and a control port of the analog switch is connected to the general-purpose input/output port of the baseband chip; in the first time sequence period of timeslot transmitting of the baseband chip, the general-purpose input/output port generates a high level, and the first channel of the analog switch is conducted with the second channel; and in the other time sequence periods of timeslot transmitting and a non-timeslot-transmitting period of the baseband chip, the general-purpose input/output port generates a low level, and the first channel of the analog switch is disconnected with the second channel.

In a fifth possible implementation manner, in combination with the first aspect or any one of the first possible implementation manner to the fourth possible implementation manner of the second aspect, the power circuit further includes a capacitor, where one end of the capacitor is connected to a current output port of the current-limiting chip, and the other end of the capacitor is connected to the ground.

In a sixth possible implementation manner, in combination with the first aspect or any one of the first possible implementation manner to the fifth possible implementation manner of the second aspect, the power circuit further includes a power management unit, where a current input port of the power management unit is connected to the current output port of the current-limiting chip, and a current output port of the power management unit is connected to a current input port of the baseband chip.

In a seventh possible implementation manner, in combination with the first aspect or any one of the first possible implementation manner to the sixth possible implementation manner of the second aspect, the wireless network adapter further includes a general-purpose serial bus interface, where the general-purpose serial bus interface is connected to the current-limiting chip, so that an external power supply supplies power to the wireless network adapter through the general-purpose serial bus interface.

BRIEF DESCRIPTION OF THE DRAWINGS

To illustrate the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
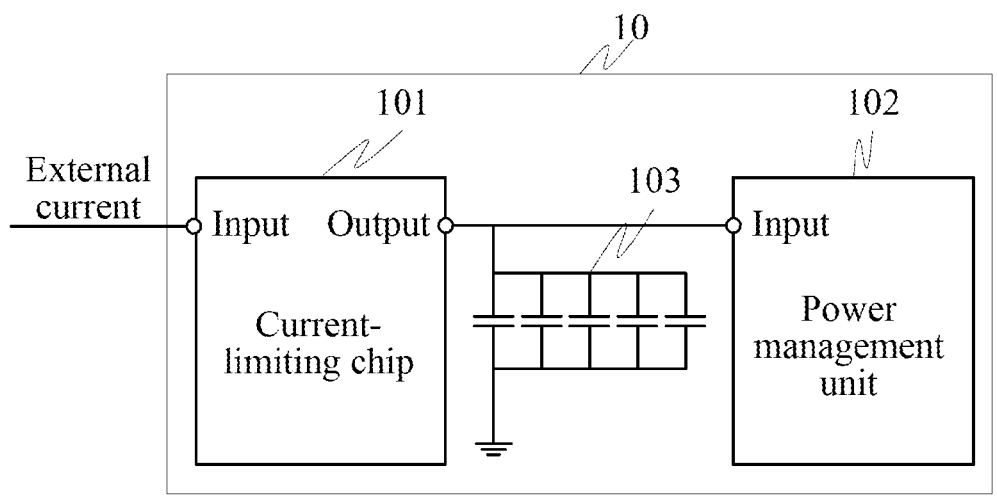
FIG. 1 is a schematic structural diagram of a power circuit of a wireless network adapter.

As shown in FIG. 1, a wireless network adapter 10 includes a current-limiting chip 101 and a power management unit 102. A current input port of the current-limiting chip 101 is connected to a load end of an external power supply, and a current output port of the current-limiting chip 101 is connected to a current input port of the power management unit 102. Generally, all wireless network adapters support the network technology type of the Global System for Mobile Communications, and data transmitting by using the General Packet Radio Service technology of a wireless network adapter of the network technology type of the Global System for Mobile Communications is timeslot transmitting. The timeslot transmitting may be classified into single-timeslot (577 us), dual-timeslot (2×577 us), multi-timeslot (n×577 us, n>2), or the like. In a timeslot transmitting period, the wireless network adapter 10 needs to extract high current (such as approximately 2.5 A) from the load end (such as a notebook computer or a personal computer) of the external power supply. However, due to an effect of the current-limiting chip 101 of the wireless network adapter 10, input current is confined to a relatively small value such as approximately 1.2 A. A specific current-limiting value may be set according to a specific project and in this case, the load end of the external power supply cannot provide energy required by transmit power of the wireless network adapter. Therefore, a capacitor needs to be added to the wireless network adapter. For example, there are five 150 uF tantalum capacitors 103 shown in FIG. 1. The five tantalum capacitors are connected in parallel, one end of the five tantalum capacitors 103 that are connected in parallel is connected to the current output port of the current-limiting chip 101, the other end of the five tantalum capacitors 103 that are connected in parallel is connected to the ground, and the five tantalum capacitors 103 store the energy required by the transmit power of the wireless network adapter into a large 750 uF capacitor. Such a large-capacity tantalum capacitor, however, brings very high costs and is sometimes even restricted for use. Whether these capacitors can be saved is key to reducing the costs of the wireless network adapter. In addition, a size of a tantalum capacitor is about 3.5×2.8 mm, and then a size of five such tantalum capacitors is close to 50 mm^2. Saving these capacitors will help to downsize the wireless network adapter.

Figure 2:
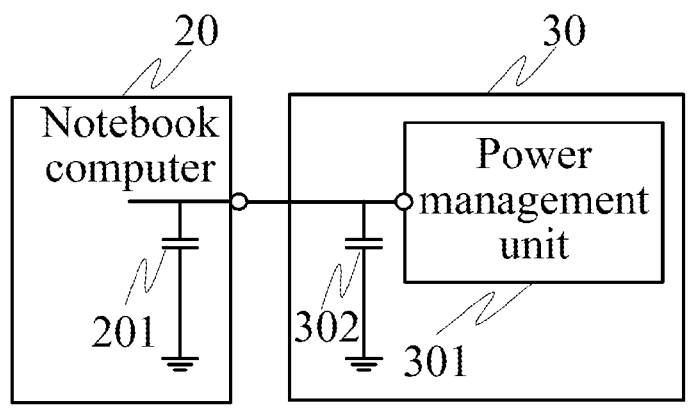
FIG. 2 is a schematic structural diagram of a power circuit of another wireless network adapter.

As shown in FIG. 2, currently in some solutions, the current-limiting chip in the power circuit of the wireless network adapter is removed to save capacitors. The load end of the external power supply may be a notebook computer, a personal computer, or the like. In FIG. 2, a notebook computer is used as an example. A power circuit of a wireless network adapter 30 no longer includes a current-limiting chip, and a USB interface of a notebook computer 20 is directly connected to a current input port of a power management unit 301 of the wireless network adapter 30. If the current-limiting chip in the power circuit of the wireless network adapter 30 is removed, because the USB interface of the notebook computer 20 has a capacitor, a capacitor 302 of the wireless network adapter may be used together with a capacitor 201 of the notebook computer, thereby reducing capacitors of the wireless network adapter 30. Because the wireless network adapter does not have a current-limiting chip, a relatively large drop occurs on a power voltage of the notebook computer itself if the notebook computer supplies excessively high current to the wireless network adapter. If the notebook computer does not have a current-limiting function or its power supply capability is weak, in a dual-timeslot (2×577 us) or multi-timeslot (n×577 us, n>2) case, an error will occur when the notebook computer supplies relatively high current to the wireless network adapter for more than 1 ms, causing the notebook computer to restart and thereby affecting normal use of the notebook computer and the wireless network adapter.

Timeslot transmitting of a baseband chip 402 may be classified into single-timeslot (577 us), dual-timeslot (2×577 us), multi-timeslot (n×577 us, n>2), or the like. In the embodiments of the present invention, a first time sequence period of timeslot transmitting of a baseband chip refers to a timeslot transmitting period of single-timeslot transmitting when the baseband chip is in single-timeslot transmitting mode. Alternatively, a first time sequence period of timeslot transmitting of a baseband chip refers to a first time sequence period of dual-timeslot transmitting when the baseband chip is in dual-timeslot transmitting mode. Alternatively, a first time sequence period of timeslot transmitting of a baseband chip refers to a first time sequence period of multi-timeslot transmitting when the baseband chip is in multi-timeslot transmitting mode.

In the embodiments of the present invention, the other time sequence periods of timeslot transmitting of a baseband chip refer to the other time sequence periods except for the first time sequence period of the timeslot transmitting when the baseband chip is in timeslot transmitting mode.

In the embodiments of the present invention, an impedor is a device or component that reflects or detects impedance of a certain power line, and the impedor is a resistor in various embodiments.

Figure 3:
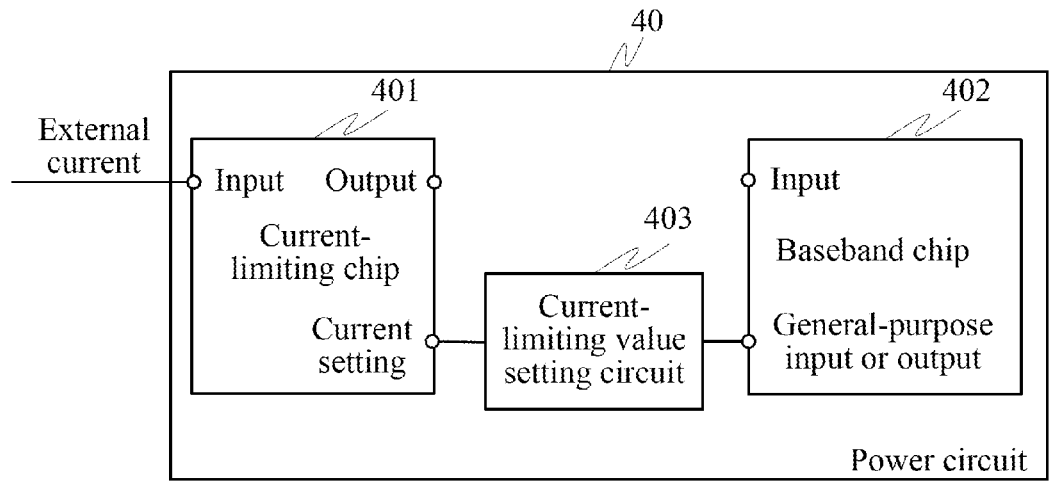
FIG. 3 is a schematic structural diagram of a power circuit of a wireless network adapter according to an embodiment of the present invention.

FIG. 3 is a schematic structural diagram of a power circuit of a wireless network adapter according to an embodiment of the present invention. A power circuit 40 includes a current-limiting chip 401, a baseband chip 402, and a current-limiting value setting circuit 403. A current setting port of the current-limiting chip 401 is connected to a general-purpose input/output port of the baseband chip 402 through the current-limiting value setting circuit 403. In a first time sequence period of timeslot transmitting of the baseband chip 402, the general-purpose input/output port generates a first signal so that the current-limiting value setting circuit 403 sets a current-limiting value of the current-limiting chip 401 as a first current-limiting value. In the other time sequence periods of timeslot transmitting of the baseband chip 402, the general-purpose input/output port generates a second signal so that the current-limiting value setting circuit 403 sets the current-limiting value of the current-limiting chip 401 as a second current-limiting value. The first current-limiting value is greater than the second current-limiting value. When the baseband chip 402 is in Global System for Mobile Communications timeslot transmitting mode, a low level, a high level, or a high-impedance state may be generated through the general-purpose input/output port of the baseband chip 402 to dynamically set the current-limiting value of the current-limiting chip 401, thereby changing input current of the wireless network adapter. Specifically, the current-limiting value setting circuit 403 may set the current-limiting value of the current-limiting chip 401 as the first current-limiting value or the second current-limiting value by using the current setting port of the current-limiting chip 401.

In this embodiment of the present invention, a current-limiting value setting circuit is added in a power circuit of a wireless network adapter. In a first time sequence period of timeslot transmitting of a baseband chip, a general-purpose input/output port of the baseband chip generates a first signal so that a current-limiting value of the current-limiting chip is set as a first current-limiting value through the current-limiting value setting circuit. In the other time sequence periods of timeslot transmitting of the baseband chip, the general-purpose input/output port of the baseband chip generates a second signal so that the current-limiting value of the current-limiting chip is set as a second current-limiting value through the current-limiting value setting circuit. The first current-limiting value is greater than the second current-limiting value. In this way, capacitors of the wireless network adapter are reduced, and normal working of the wireless network adapter is also ensured, thereby helping to reduce the costs of the wireless network adapter and downsize the wireless network adapter.

Figure 4:
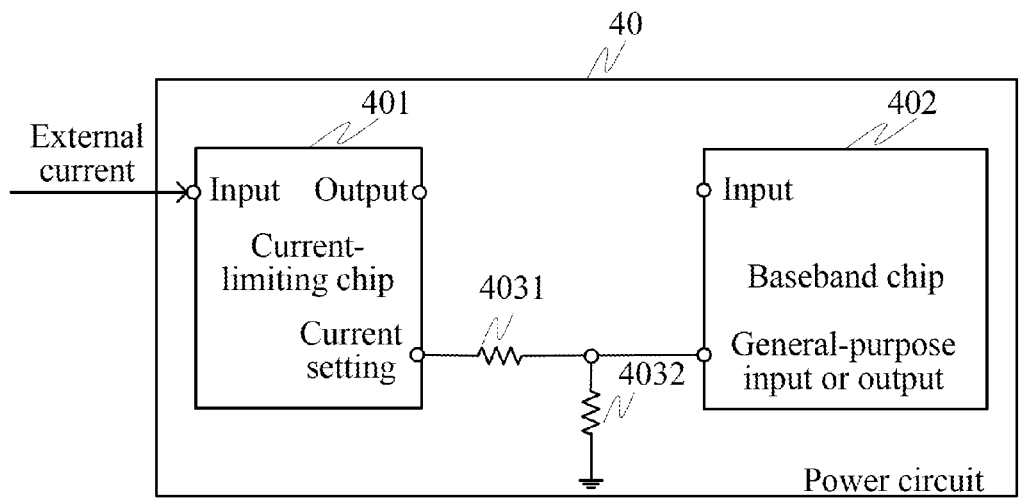
FIG. 4 is a schematic structural diagram of a power circuit of another wireless network adapter according to an embodiment of the present invention.

As shown in FIG. 4, the current-limiting value setting circuit 403 includes a first impedor 4031 and a second impedor 4032. The current setting port of the current-limiting chip 401 is connected to the general-purpose input/output port of the baseband chip 402 through the first impedor 4031, and the general-purpose input/output port of the baseband chip 402 is connected to the ground through the second impedor 4032. In the first time sequence period of timeslot transmitting of the baseband chip 402, the general-purpose input/output port generates a low level. In the other time sequence periods of timeslot transmitting of the baseband chip 402, the general-purpose input/output port generates a high-impedance state.

Figure 5:
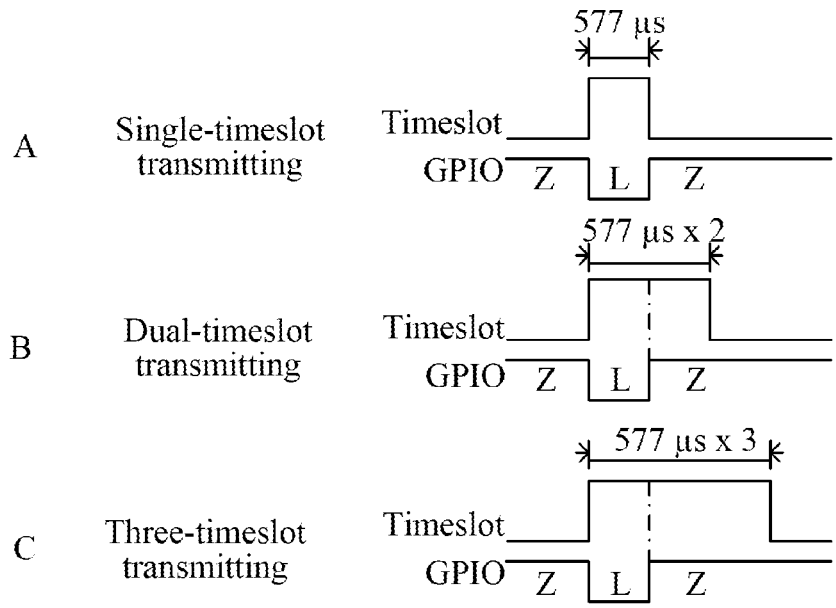
FIG. 5 is a schematic diagram of states of timeslot transmitting of a wireless network adapter according to an embodiment of the present invention.

Specifically, the outputting, by the general-purpose input/output port of the baseband chip 402, a low level or a high-impedance state is shown in FIG. 5:

A. When the baseband chip 402 is in single-timeslot transmitting mode, in a timeslot transmitting period, the general-purpose input/output port of the baseband chip 402 generates a low level "L". In a non-timeslot-transmitting period, the general-purpose input/output port of the baseband chip 402 generates a high-impedance state "Z".

B. When the baseband chip 402 is in dual-timeslot transmitting mode, in a first time sequence period of dual-timeslot transmitting, the general-purpose input/output port of the baseband chip 402 generates a low level "L". In a second time sequence period of dual-timeslot transmitting, the general-purpose input/output port of the baseband chip 402 generates a high-impedance state "Z". In a non-timeslot-transmitting period, the general-purpose input/output port of the baseband chip 402 generates a high-impedance state "Z".

C. When the baseband chip 402 is in multi-timeslot transmitting mode, in a first time sequence period of multi-timeslot transmitting, the general-purpose input/output port of the baseband chip 402 generates a low level "L". In the other time sequence periods of multi-timeslot transmitting, the general-purpose input/output port of the baseband chip 402 generates a high-impedance state "Z". In a non-timeslot-transmitting period, the general-purpose input/output port of the baseband chip 402 generates a high-impedance state "Z".

In the power circuit according to this embodiment of the present invention, it is assumed that resistance of the first impedor 4031 is R1, resistance of the second impedor 4032 is R2, and a current-limiting value is the first current-limiting value 1650/R1 when the general-purpose input/output port generates a low level. The current-limiting value is the second current-limiting value 1650/(R1+R2) when the general-purpose input/output port generates a high-impedance state. Assuming that the first current-limiting value is 1.8 A and the second current-limiting value is 1.2 A, then the resistance of the first impedor 4031 is R1=9100 HM and the resistance of the second impedor 4032 is R2=4650 HM.

Therefore, after the baseband chip 402 is powered on, in a non-timeslot-transmitting period, the general-purpose input/output port of the baseband chip 402 generates a high-impedance state, and the current-limiting value is the second current-limiting value 1650/(R1+R2), that is, 1.2 A.

When the baseband chip 402 is in single-timeslot transmitting mode, in a timeslot transmitting period, the general-purpose input/output port of the baseband chip 402 generates a low level, the current-limiting value is the first current-limiting value 1650/R1, that is, 1.8 A, and energy required by transmit power of the wireless network adapter is mostly provided by a load end of an external power supply. In a non-timeslot transmitting period, the general-purpose input/output port of the baseband chip 402 generates a high-impedance state, and the current-limiting value is the second current-limiting value 1650/(R1+R2), that is, 1.2 A.

When the baseband chip 402 is in dual-timeslot transmitting mode, in the first time sequence period of dual-timeslot transmitting, the general-purpose input/output port of the baseband chip 402 generates a low level, the current-limiting value is the first current-limiting value 1650/R1, that is, 1.8 A, and the energy required by the transmit power of the wireless network adapter is mostly provided by the load end of the external power supply. In the second time sequence period of dual-timeslot transmitting, the general-purpose input/output port of the baseband chip 402 generates a high-impedance state, the current-limiting value is the second current-limiting value 1650/(R1+R2), that is, 1.2 A, and a relatively large drop occurs on a power voltage of the wireless network adapter because current supplied by the load end decreases. But there is a minimum-value range for an input voltage of a power management unit of the wireless network adapter and normal working of the wireless network adapter can be ensured as long as the power voltage is still within an input voltage range of the power management unit after the power voltage drops. Since the current-limiting chip 401 of the wireless network adapter does not limit current (or the current is relatively high) in the first time sequence only but limits current (or the current is relatively low) in the second time sequence, current-limiting time of the current-limiting chip 401 at the load end does not exceed 1 ms. Therefore, no error is reported and normal use of the wireless network adapter is not affected. In a non-timeslot-transmitting period, the general-purpose input/output port of the baseband chip 402 generates a high-impedance state and the current-limiting value is the second current-limiting value 1650/(R1+R2), that is, 1.2 A.

When the baseband chip 402 is in multi-timeslot transmitting mode, in the first time sequence period of multi-timeslot transmitting, the general-purpose input/output port of the baseband chip 402 generates a low level, the current-limiting value is the first current-limiting value 1650/R1, that is, 1.8 A, and the energy required by the transmit power of the wireless network adapter is mostly provided by the load end of the external power supply. In the other time sequence periods of multi-timeslot transmitting, the general-purpose input/output port of the baseband chip 402 generates a high-impedance state, the current-limiting value is the second current-limiting value 1650/(R1+R2), that is, 1.2 A, and a relatively large drop occurs on the power voltage of the wireless network adapter because the current supplied by the load end decreases. But there is a minimum-value range for the input voltage of the power management unit of the wireless network adapter and the normal working of the wireless network adapter can be ensured as long as the power voltage is still within the input voltage range of the power management unit after the power voltage drops. Since the current-limiting chip 401 does not limit current (or the current is relatively high) in only the first time sequence but limits current (or the current is relatively low) in the second time sequence, the current-limiting time of the current-limiting chip 401 at the load end does not exceed 1 ms. Therefore, no error is reported and normal use of the wireless network adapter is not affected. In a non-timeslot-transmitting period, the general-purpose input/output port of the baseband chip 402 generates a high-impedance state and the current-limiting value is the second current-limiting value 1650/(R1+R2), that is, 1.2 A.

In this embodiment of the present invention, the current-limiting value setting circuit includes a first impedor and a second impedor. In a first time sequence period of timeslot transmitting of a baseband chip, a general-purpose input/output port of the baseband chip generates a low level so that a current-limiting value of the current-limiting chip is set as a first current-limiting value through the current-limiting value setting circuit. In the other time sequence periods of timeslot transmitting of the baseband chip, the general-purpose input/output port of the baseband chip generates a high-impedance state so that the current-limiting value of the current-limiting chip is set as a second current-limiting value through the current-limiting value setting circuit. The first current-limiting value is greater than the second current-limiting value. In this way, capacitors of a wireless network adapter are reduced and normal working of the wireless network adapter is also ensured, thereby helping to reduce the costs of the wireless network adapter and downsize the wireless network adapter.

Figure 6:
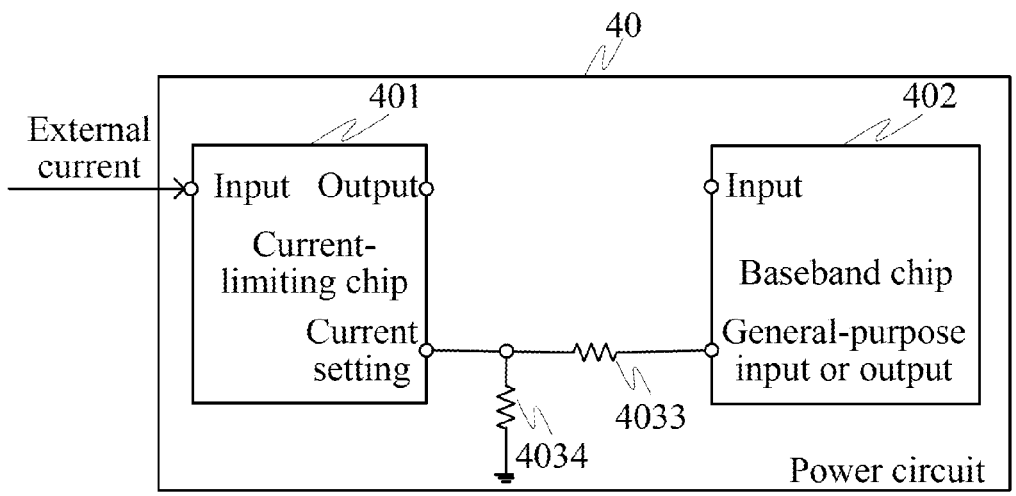
FIG. 6 is a schematic structural diagram of a power circuit of another wireless network adapter according to an embodiment of the present invention.

As shown in FIG. 6, the current-limiting value setting circuit 403 includes a third impedor 4033 and a fourth impedor 4034. The current setting port of the current-limiting chip 401 is connected to the general-purpose input/output port of the baseband chip 401 through the third impedor 4033. The general-purpose input/output port of the baseband chip 402 is connected to the ground through the fourth impedor 4034. In the first time sequence period of timeslot transmitting of the baseband chip 402, the general-purpose input/output port generates a low level. In the other time sequence periods of timeslot transmitting of the baseband chip 402, the general-purpose input/output port generates a high-impedance state.

Specifically, the outputting, by the general-purpose input/output port of the baseband chip 402, a low level or a high-impedance state is shown in FIG. 5:

A. When the baseband chip 402 is in single-timeslot transmitting mode, in a timeslot transmitting period, the general-purpose input/output port of the baseband chip 402 generates a low level "L". In a non-timeslot-transmitting period, the general-purpose input/output port of the baseband chip 402 generates a high-impedance state "Z".

B. When the baseband chip 402 is in dual-timeslot transmitting mode, in a first time sequence period of dual-timeslot transmitting, the general-purpose input/output port of the baseband chip 402 generates a low level "L". In a second time sequence period of dual-timeslot transmitting, the general-purpose input/output port of the baseband chip 402 generates a high-impedance state "Z". In a non-timeslot-transmitting period, the general-purpose input/output port of the baseband chip 402 generates a high-impedance state "Z".

C. When the baseband chip 402 is in multi-timeslot transmitting mode, in a first time sequence period of multi-timeslot transmitting, the general-purpose input/output port of the baseband chip 402 generates a low level "L". In the other time sequence periods of multi-timeslot transmitting, the general-purpose input/output port of the baseband chip 402 generates a high-impedance state "Z". In a non-timeslot-transmitting period, the general-purpose input/output port of the baseband chip 402 generates a high-impedance state "Z".

In the power circuit according to this embodiment of the present invention, it is assumed that resistance of the third impedor 4033 is R1, resistance of the fourth impedor 4034 is R2, and a current-limiting value is the first current-limiting value 1650×(1/R3+1/R4) when the general-purpose input/output port generates a low level. The current-limiting value is the second current-limiting value 1650/R4 when the general-purpose input/output port generates a high-impedance state.

In this embodiment of the present invention, the current-limiting value setting circuit includes a third impedor and a fourth impedor. In a first time sequence period of timeslot transmitting of a baseband chip, a general-purpose input/output port of the baseband chip generates a low level so that a current-limiting value of the current-limiting chip is set as a first current-limiting value through the current-limiting value setting circuit. In the other time sequence periods of timeslot transmitting of the baseband chip, the general-purpose input/output port of the baseband chip generates a high-impedance state so that the current-limiting value of the current-limiting chip is set as a second current-limiting value through the current-limiting value setting circuit. The first current-limiting value is greater than the second current-limiting value. In this way, capacitors of a wireless network adapter are reduced and normal working of the wireless network adapter is also ensured, thereby helping to reduce the costs of the wireless network adapter and downsize the wireless network adapter.

Figure 7:
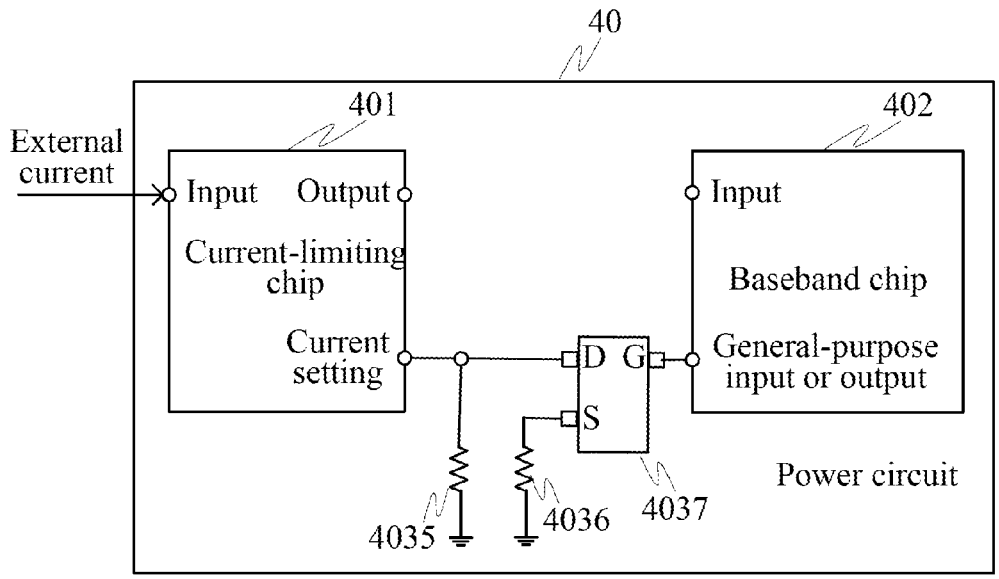
FIG. 7 is a schematic structural diagram of a power circuit of another wireless network adapter according to an embodiment of the present invention.

As shown in FIG. 7, the current-limiting value setting circuit 403 includes a fifth impedor 4035, a sixth impedor 4036, and a MOS (metal oxide semiconductor) transistor 4037. The current setting port of the current-limiting chip 401 is connected to the ground through the fifth impedor 4035. A drain electrode D of the MOS transistor 4037 is connected to the current setting port of the current-limiting chip 401, a gate electrode G of the MOS transistor 4037 is connected to the general-purpose input/output port of the baseband chip 402, and a source electrode S of the MOS transistor 4037 is connected to the ground through the sixth impedor 4036.

If the MOS transistor 4037 is an N-channel MOS transistor, in the first time sequence period of timeslot transmitting of the baseband chip 402, the general-purpose input/output port generates a high level and the drain electrode of the MOS transistor 4037 is conducted with the source electrode. In the other time sequence periods of timeslot transmitting of the baseband chip 402, the general-purpose input/output port generates a low level and the drain electrode of the MOS transistor 4037 is disconnected with the source electrode.

Alternatively, if the MOS transistor 4037 is a P-channel MOS transistor, in the first time sequence period of timeslot transmitting of the baseband chip 402, the general-purpose input/output port generates a low level and the drain electrode of the MOS transistor 4037 is conducted with the source electrode. In the other time sequence periods of timeslot transmitting of the baseband chip 402, the general-purpose input/output port generates a high level and the drain electrode of the MOS transistor 4037 is disconnected with the source electrode.

Specifically, if the MOS transistor 4037 is an N-channel MOS transistor, the drain electrode D of the MOS transistor 4037 is conducted with the source electrode S when the general-purpose input/output port generates a high level. Alternatively, the drain electrode D of the MOS transistor 4037 is disconnected with the source electrode S when the general-purpose input/output port generates a low level.

Figure 8:
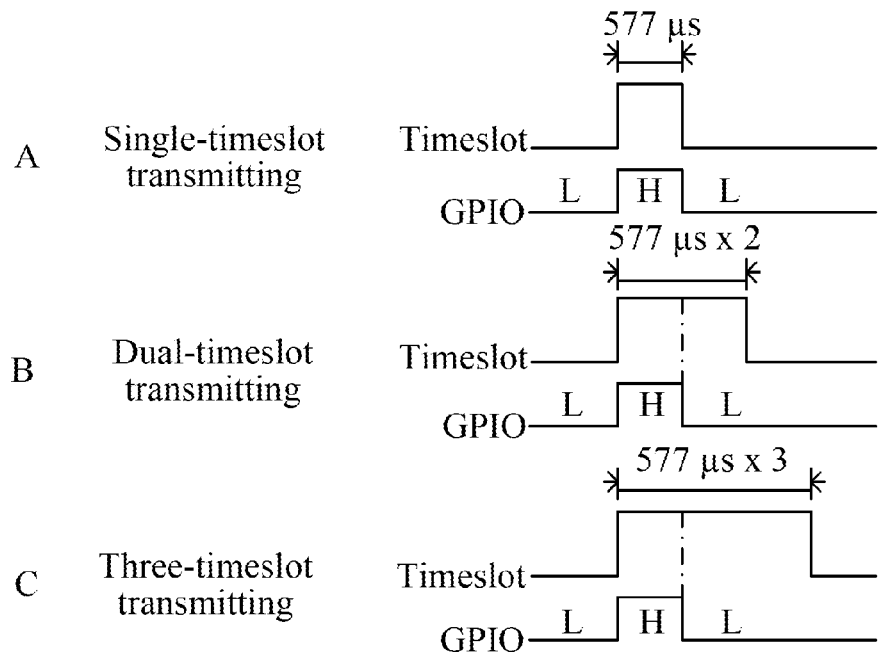
FIG. 8 is a schematic diagram of states of timeslot transmitting of another wireless network adapter according to an embodiment of the present invention.

The outputting, by the general-purpose input/output port of the baseband chip 402 when the MOS transistor 4037 is an N-channel MOS transistor, a low level or a high-impedance state is shown in FIG. 8:

A. When the baseband chip 402 is in single-timeslot transmitting mode, in a timeslot transmitting period, the general-purpose input/output port of the baseband chip 402 generates a high level "H". In a non-timeslot-transmitting period, the general-purpose input/output port of the baseband chip 402 generates a low level "L".

B. When the baseband chip 402 is in dual-timeslot transmitting mode, in a first time sequence period of dual-timeslot transmitting, the general-purpose input/output port of the baseband chip 402 generates a high level "H". In a second time sequence period of dual-timeslot transmitting, the general-purpose input/output port of the baseband chip 402 generates a low level "L". In a non-timeslot-transmitting period, the general-purpose input/output port of the baseband chip 402 generates a low level "L".

C. When the baseband chip 402 is in multi-timeslot transmitting mode, in a first time sequence period of multi-timeslot transmitting, the general-purpose input/output port of the baseband chip 402 generates a high level "H". In the other time sequence periods of multi-timeslot transmitting, the general-purpose input/output port of the baseband chip 402 generates a low level "L". In a non-timeslot-transmitting period, the general-purpose input/output port of the baseband chip 402 generates a low level "L".

In the power circuit according to this embodiment of the present invention, it is assumed that resistance of the fifth impedor 4035 is R5, resistance of the sixth impedor 4036 is R6, and a current-limiting value is the first current-limiting value 1650×(1/R5+1/R6) when the general-purpose input/output port generates a high level. The current-limiting value is the second current-limiting value 1650/R5 when the general-purpose input/output port generates a low level.

If the MOS transistor 4037 is a P-channel MOS transistor, a state of a level output by the general-purpose input/output port of the baseband chip 402 is contrary to FIG. 8. That is, in the first time sequence period of timeslot transmitting of the baseband chip 402, the general-purpose input/output port generates a low level, and in the other time sequence periods of timeslot transmitting of the baseband chip 402, the general-purpose input/output port generates a high level.

In this embodiment of the present invention, the current-limiting value setting circuit includes a fifth impedor, a sixth impedor, and a MOS transistor; a general-purpose input/output port generates a signal to control conduction and disconnection of the MOS transistor. In a first time sequence period of timeslot transmitting of a baseband chip, a general-purpose input/output port of the baseband chip generates a low level so that a current-limiting value of the current-limiting chip is set as a first current-limiting value through the current-limiting value setting circuit. In the other time sequence periods of timeslot transmitting of the baseband chip, the general-purpose input/output port of the baseband chip generates a high level so that the current-limiting value of the current-limiting chip is set as a second current-limiting value through the current-limiting value setting circuit. The first current-limiting value is greater than the second current-limiting value. In this way, capacitors of a wireless network adapter are reduced and normal working of the wireless network adapter is also ensured, thereby helping to reduce the costs of the wireless network adapter and downsize the wireless network adapter.

Figure 9:
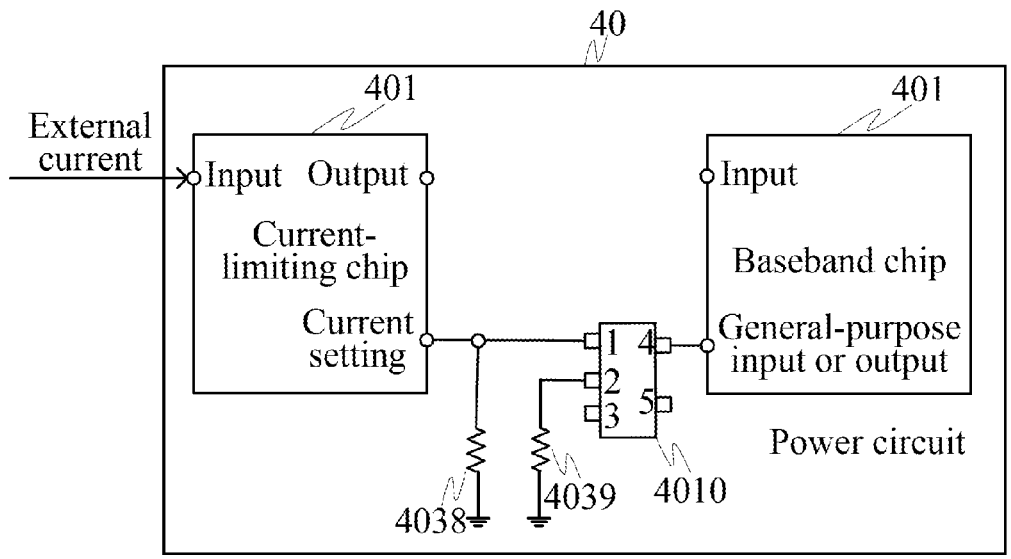
FIG. 9 is a schematic structural diagram of a power circuit of another wireless network adapter according to an embodiment of the present invention.

As shown in FIG. 9, the current-limiting value setting circuit 403 includes a seventh impedor 4038, an eight impedor 4039, and an analog switch 4010. The current setting port of the current-limiting chip 401 is connected to the ground through the seventh impedor 4038. A first channel of the analog switch 4010 is connected to the current setting port of the current-limiting chip 401, a second channel of the analog switch 4010 is connected to the ground through the eighth impedor 4039, and a control port of the analog switch 4010 is connected to the general-purpose input/output port of the baseband chip 402. In the first time sequence period of timeslot transmitting of the baseband chip 402, the general-purpose input/output port generates a high level, and the first channel of the analog switch 4010 is conducted with the second channel. In the other time sequence periods of timeslot transmitting of the baseband chip 402, the general-purpose input/output port generates a low level, and the first channel of the analog switch 4010 is disconnected with the second channel.

Specifically, the outputting, by the general-purpose input/output port of the baseband chip 402, a high level or a low level is shown in FIG. 8:

A. When the baseband chip 402 is in single-timeslot transmitting mode, in a timeslot transmitting period, the general-purpose input/output port of the baseband chip 402 generates a high level "H". In a non-timeslot-transmitting period, the general-purpose input/output port of the baseband chip 402 generates a low level "L".

B. When the baseband chip 402 is in dual-timeslot transmitting mode, in a first time sequence period of dual-timeslot transmitting, the general-purpose input/output port of the baseband chip 402 generates a high level "H". In a second time sequence period of dual-timeslot transmitting, the general-purpose input/output port of the baseband chip 402 generates a low level "L". In a non-timeslot-transmitting period, the general-purpose input/output port of the baseband chip 402 generates a low level "L".

C. When the baseband chip 402 is in multi-timeslot transmitting mode, in a first time sequence period of multi-timeslot transmitting, the general-purpose input/output port of the baseband chip 402 generates a high level "H". In the other time sequence periods of multi-timeslot transmitting, the general-purpose input/output port of the baseband chip 402 generates a low level "L". In a non-timeslot-transmitting period, the general-purpose input/output port of the baseband chip 402 generates a low level "L".

In the power circuit according to this embodiment of the present invention, it is assumed that resistance of the seventh impedor 4038 is R7, resistance of the eighth impedor 4039 is R8, and a current-limiting value is the first current-limiting value 1650×(1/R7+1/R8) when the general-purpose input/output port generates a high level. The current-limiting value is the second current-limiting value 1650/R7 when the general-purpose input/output port generates a low level.

In this embodiment of the present invention, the current-limiting value setting circuit includes a seventh impedor, an eighth impedor, and an analog switch. A general-purpose input/output port generates a signal to control conduction and disconnection of the analog switch; in a first time sequence period of timeslot transmitting of a baseband chip, a general-purpose input/output port of the baseband chip generates a high level so that a current-limiting value of the current-limiting chip is set as a first current-limiting value through the current-limiting value setting circuit. In the other time sequence periods of timeslot transmitting of the baseband chip, the general-purpose input/output port of the baseband chip generates a low level so that the current-limiting value of the current-limiting chip is set as a second current-limiting value through the current-limiting value setting circuit. The first current-limiting value is greater than the second current-limiting value. In this way, capacitors of a wireless network adapter are reduced and normal working of the wireless network adapter is also ensured, thereby helping to reduce the costs of the wireless network adapter and downsize the wireless network adapter.

Figure 10:
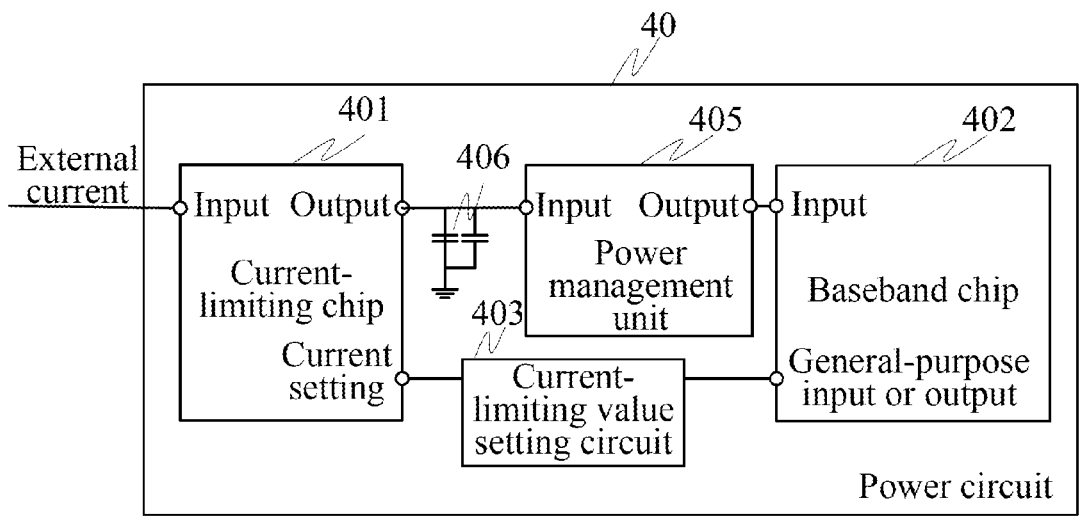
FIG. 10 is a schematic structural diagram of a power circuit of another wireless network adapter according to an embodiment of the present invention.

As shown in FIG. 10, the power circuit 40 further includes a power management unit 405. A current input port of the power management unit 405 is connected to a current output port of the current-limiting chip 401, and a current output port of the power management unit 405 is connected to a current input port of the baseband chip 402. The power management unit 405 receives current input by the current-limiting chip 401, and supplies power to the baseband chip 402. In addition, the power management unit 405 may also supply power to other power-consuming components in the power circuit 40.

Further, the power circuit may further include a capacitor 406, where one end of the capacitor 406 is connected to the current output port of the current-limiting chip 401, and the other end of the capacitor 406 is connected to the ground. In this way, in the first time sequence period of the timeslot transmitting mode, the current-limiting value of the current-limiting chip 401 is the first current-limiting value. The energy required by the transmit power of the wireless network adapter is mostly provided by the load end of the external power supply, and the capacitor 406 may store energy. In the other time sequence periods of the timeslot transmitting mode, the current supplied by the load end of the external power supply decreases and the energy stored in the capacitor 406 is released to meet a requirement of the transmit power of the wireless network adapter. A specific capacitance value of the capacitor 406 and the number of capacitors may be arranged according to current required by the transmit power of the wireless network adapter. For example, two 150 uF tantalum capacitors are arranged, and this is not specifically limited herein.

Figure 11:
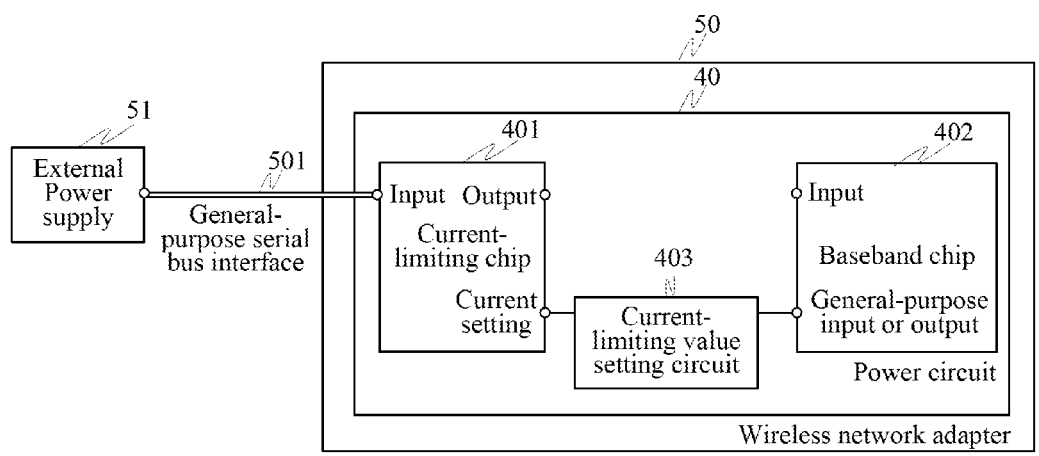
FIG. 11 is a schematic structural diagram of a wireless network adapter according to an embodiment of the present invention.

Further, as shown in FIG. 11, the power circuit may be included in a wireless network adapter 50. The wireless network adapter 50 has a general-purpose serial bus interface 501. The general-purpose serial bus interface 501 is connected to the current-limiting chip 401. The current-limiting chip 401 of the wireless network adapter 50 may be connected to an external power supply 51 (such as a notebook computer) through the general-purpose serial bus interface 501 so that the external power supply 51 supplies power to the wireless network adapter 50 through the general-purpose serial bus interface 501.

In this embodiment of the present invention, a current-limiting value setting circuit is added in a power circuit of a wireless network adapter. In a first time sequence period of timeslot transmitting of a baseband chip, a general-purpose input/output port of the baseband chip generates a first signal so that a current-limiting value of the current-limiting chip is set as a first current-limiting value through the current-limiting value setting circuit. In the other time sequence periods of timeslot transmitting of the baseband chip, the general-purpose input/output port of the baseband chip generates a second signal so that the current-limiting value of the current-limiting chip is set as a second current-limiting value through the current-limiting value setting circuit. The first current-limiting value is greater than the second current-limiting value. In this way, capacitors of the wireless network adapter are reduced and normal working of the wireless network adapter is also ensured, thereby helping to reduce the costs of the wireless network adapter and downsize the wireless network adapter.

The foregoing descriptions are merely exemplary specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power circuit, comprising:
   a current-limiting value setting circuit;
   a baseband chip;
   a current-limiting chip, wherein a current setting port of the current-limiting chip is connected to a general-purpose input/output port of the baseband chip through the current-limiting value setting circuit, wherein the general-purpose input/output port is configured to:
   generate a first signal in a first time sequence period of timeslot transmitting of the baseband chip so that the current-limiting value setting circuit sets a current-limiting value of the current-limiting chip as a first current-limiting value; and
   generate a second signal in other time sequence periods of timeslot transmitting of the baseband chip so that the current-limiting value setting circuit sets the current-limiting value of the current-limiting chip as a second current-limiting value, wherein the first current-limiting value is greater than the second current-limiting value.

2. The power circuit according to claim 1,
wherein the current-limiting value setting circuit comprises a first impedor and a second impedor,
wherein the current setting port of the current-limiting chip is connected to the general-purpose input/output port of the baseband chip through the first impedor,
wherein the general-purpose input/output port of the baseband chip is connected to a ground potential node through the second impedor,
wherein in the first time sequence period of timeslot transmitting of the baseband chip, the general-purpose input/output port generates a low level, and
wherein in the other time sequence periods of timeslot transmitting and a non-timeslot-transmitting period of the baseband chip, the general-purpose input/output port generates a high-impedance state.

3. The power circuit according to claim 1,
wherein the current-limiting value setting circuit comprises a third impedor and a fourth impedor,
wherein the current setting port of the current-limiting chip is connected to the general-purpose input/output port of the baseband chip through the third impedor,
wherein the general-purpose input/output port of the baseband chip is connected to a ground potential node through the fourth impedor,
wherein in the first time sequence period of timeslot transmitting of the baseband chip, the general-purpose input/output port generates a low level, and
wherein in the other time sequence periods of timeslot transmitting and a non-timeslot-transmitting period of the baseband chip, the general-purpose input/output port generates a high-impedance state.

4. The power circuit according to claim 1,
wherein the current-limiting value setting circuit comprises a fifth impedor, a sixth impedor, and a MOS transistor,
wherein the current setting port of the current-limiting chip is connected to a ground potential node through the fifth impedor,
wherein a drain electrode of the MOS transistor is connected to the current setting port of the current-limiting chip, a gate electrode of the MOS transistor is connected to the general-purpose input/output port of the baseband chip, and a source electrode of the MOS transistor is connected to the ground potential node through the sixth impedor,
wherein the MOS transistor is an N-channel MOS transistor, wherein in the first time sequence period of timeslot transmitting of the baseband chip, the general-purpose input/output port generates a high level and the drain electrode of the MOS transistor is conducted with the source electrode, and wherein in the other time sequence periods of timeslot transmitting and a non-timeslot-transmitting period of the baseband chip, the general-purpose input/output port generates a low level and the drain electrode of the MOS transistor is disconnected with the source electrode.

5. The power circuit according to claim 1,
wherein the current-limiting value setting circuit comprises a fifth impedor, a sixth impedor, and a MOS transistor,
wherein the current setting port of the current-limiting chip is connected to a ground potential node through the fifth impedor,
wherein a drain electrode of the MOS transistor is connected to the current setting port of the current-limiting chip, a gate electrode of the MOS transistor is connected to the general-purpose input/output port of the baseband chip, and a source electrode of the MOS transistor is connected to the ground potential node through the sixth impedor,
wherein the MOS transistor is a P-channel MOS transistor, wherein in the first time sequence period of timeslot transmitting of the baseband chip, the general-purpose input/output port generates a low level and the drain electrode of the MOS transistor is conducted with the source electrode, and wherein in the other time sequence periods of timeslot transmitting and a non-timeslot-transmitting period of the baseband chip, the general-purpose input/output port generates a high level and the drain electrode of the MOS transistor is disconnected with the source electrode.

6. The power circuit according to claim 1,
wherein the current-limiting value setting circuit comprises a seventh impedor, an eighth impedor, and an analog switch,
wherein the current setting port of the current-limiting chip is connected to a ground potential node through the seventh impedor,
wherein a first channel of the analog switch is connected to the current setting port of the current-limiting chip, a second channel of the analog switch is connected to the ground potential node through the eighth impedor, and a control port of the analog switch is connected to the general-purpose input/output port of the baseband chip,
wherein in the first time sequence period of timeslot transmitting of the baseband chip, the general-purpose input/output port generates a high level, and the first channel of the analog switch is conducted with the second channel, and
wherein in the other time sequence periods of timeslot transmitting and a non-timeslot-transmitting period of the baseband chip, the general-purpose input/output port generates a low level, and the first channel of the analog switch is disconnected with the second channel.

7. The power circuit according to claim 1, further comprising a capacitor, wherein one end of the capacitor is connected to a current output port of the current-limiting chip, and the other end of the capacitor is connected to a ground potential node.

8. The power circuit according to claim 1, further comprising a power management unit, wherein a current input port of the power management unit is connected to a current output port of the current-limiting chip, and wherein a current output port of the power management unit is connected to a current input port of the baseband chip.

9. A wireless network adapter comprising a power circuit, the power circuit comprising
a current-limiting value setting circuit, and
a baseband chip;
a current-limiting chip, wherein a current setting port of the current-limiting chip is connected to a general-purpose input/output port of the baseband chip through the current-limiting value setting circuit, wherein the general-purpose input/output port is configured to:
generate a first signal in a first time sequence period of timeslot transmitting of the baseband chip so that the current-limiting value setting circuit sets a current-limiting value of the current-limiting chip as a first current-limiting value; and
generate a second signal in other time sequence periods of timeslot transmitting of the baseband chip so that the current-limiting value setting circuit sets the current-limiting value of the current-limiting chip as a second current-limiting value, and wherein the first current-limiting value is greater than the second current-limiting value.

10. The wireless network adapter according to claim 9, wherein the current-limiting value setting circuit comprises a first impedor and a second impedor, wherein the current setting port of the current-limiting chip is connected to the general-purpose input/output port of the baseband chip through the first impedor, and the general-purpose input/output port of the baseband chip is connected to a ground potential node through the second impedor, wherein in the first time sequence period of timeslot transmitting of the baseband chip, the general-purpose input/output port generates a low level, and wherein in the other time sequence periods of timeslot transmitting and a non-timeslot-transmitting period of the baseband chip, the general-purpose input/output port generates a high-impedance state.

11. The wireless network adapter according to claim 9, wherein the current-limiting value setting circuit comprises a third impedor and a fourth impedor, wherein the current setting port of the current-limiting chip is connected to the general-purpose input/output port of the baseband chip through the third impedor, and the general-purpose input/output port of the baseband chip is connected to a ground potential node through the fourth impedor, wherein in the first time sequence period of timeslot transmitting of the baseband chip, the general-purpose input/output port generates a low level; and in the other time sequence periods of timeslot transmitting and a non-timeslot-transmitting period of the baseband chip, the general-purpose input/output port generates a high-impedance state.

12. The wireless network adapter according to claim 9, wherein the current-limiting value setting circuit comprises a fifth impedor, a sixth impedor, and a MOS transistor, wherein the current setting port of the current-limiting chip is connected to a ground potential node through the fifth impedor, wherein a drain electrode of the MOS transistor is connected to the current setting port of the current-limiting chip, a gate electrode of the MOS transistor is connected to the general-purpose input/output port of the baseband chip, and a source electrode of the MOS transistor is connected to the ground potential node through the sixth impedor, wherein the MOS transistor is an N-channel MOS transistor, wherein in the first time sequence period of timeslot transmitting of the baseband chip, the general-purpose input/output port generates a high level and the drain electrode of the MOS transistor is conducted with the source electrode, and wherein in the other time sequence periods of timeslot transmitting and a non-timeslot-transmitting period of the baseband chip, the general-purpose input/output port generates a low level and the drain electrode of the MOS transistor is disconnected with the source electrode.

13. The wireless network adapter according to claim 9, wherein the current-limiting value setting circuit comprises a fifth impedor, a sixth impedor, and a MOS transistor, wherein the current setting port of the current-limiting chip is connected to a ground potential node through the fifth impedor, wherein a drain electrode of the MOS transistor is connected to the current setting port of the current-limiting chip, a gate electrode of the MOS transistor is connected to the general-purpose input/output port of the baseband chip, and a source electrode of the MOS transistor is connected to the ground potential node through the sixth impedor, wherein the MOS transistor is a P-channel MOS transistor, wherein in the first time sequence period of timeslot transmitting of the baseband chip, the general-purpose input/output port generates a low level and the drain electrode of the MOS transistor is conducted with the source electrode, and wherein in the other time sequence periods of timeslot transmitting and a non-timeslot-transmitting period of the baseband chip, the general-purpose input/output port generates a high level and the drain electrode of the MOS transistor is disconnected with the source electrode.

14. The wireless network adapter according to claim 9, wherein the current-limiting value setting circuit comprises a seventh impedor, an eighth impedor, and an analog switch, wherein the current setting port of the current-limiting chip is connected to a ground potential node through the seventh impedor, wherein a first channel of the analog switch is connected to the current setting port of the current-limiting chip, a second channel of the analog switch is connected to the ground potential node through the eighth impedor, and a control port of the analog switch is connected to the general-purpose input/output port of the baseband chip, wherein in the first time sequence period of timeslot transmitting of the baseband chip, the general-purpose input/output port generates a high level, and the first channel of the analog switch is conducted with the second channel, and wherein in the other time sequence periods of timeslot transmitting and a non-timeslot-transmitting period of the baseband chip, the general-purpose input/output port generates a low level, and the first channel of the analog switch is disconnected with the second channel.

15. The wireless network adapter according to claim 9, wherein the power circuit further comprises a capacitor, wherein one end of the capacitor is connected to a current output port of the current-limiting chip, and the other end of the capacitor is connected to a ground potential node.

16. The wireless network adapter according to claim 9, wherein the power circuit further comprises a power management unit, wherein a current input port of the power management unit is connected to a current output port of the current-limiting chip, and wherein a current output port of the power management unit is connected to a current input port of the baseband chip.

17. The wireless network adapter according to claim 9, further comprising a general-purpose serial bus interface, wherein the general-purpose serial bus interface is connected to the current-limiting chip so that an external power supply supplies power to the wireless network adapter through the general-purpose serial bus interface.

* * * * *